United States Patent [19]
Cvetko et al.

[11] 4,065,134
[45] Dec. 27, 1977

[54] NEEDLE ASSEMBLIES FOR PHONOGRAPH PICKUP CARTRIDGES

[75] Inventors: Henry J. Cvetko; John L. Kuykendall, both of Conneaut, Ohio

[73] Assignee: The Astatic Corporation, Conneaut, Ohio

[21] Appl. No.: 637,078

[22] Filed: Dec. 2, 1975

[51] Int. Cl.² ............ G11B 3/02; H04R 1/18; H04R 17/08
[52] U.S. Cl. ................ 274/37; 179/100.41 P
[58] Field of Search .......... 274/37; 179/100.41 B, 179/100.41 C, 100.41 D, 100.41 G, 100.41 M, 100.41 P, 100.41 V

[56] References Cited

U.S. PATENT DOCUMENTS

| 2,577,149 | 12/1951 | Pelton et al. | 274/37 |
|---|---|---|---|
| 2,703,343 | 3/1955 | Snepvangers | 179/100.41 P |
| 3,334,904 | 8/1967 | Haines | 274/37 |
| 3,482,061 | 12/1969 | Grado | 179/100.41 K |
| 3,531,601 | 9/1970 | Muttick | 274/37 |
| 3,699,268 | 10/1972 | Miller | 274/37 |
| 3,975,025 | 8/1976 | Obata et al. | 274/37 |

Primary Examiner—Steven L. Stephan
Attorney, Agent, or Firm—Michael Williams

[57] ABSTRACT

A needle assembly for a phonograph pickup cartridge wherein the pickup needle coupler and shank are movable relative to a drive member which is disposed between the needle shank and the mechanoelectric transducer means, to vary the position of the needle tip with respect to the cartridge drive member along the lonitudinal axis of the cartridge, and thus cause predetermined selectable changes in the needle lever ratio which in turn causes changes in compliance and output of the cartridge-needle assembly.

6 Claims, 17 Drawing Figures

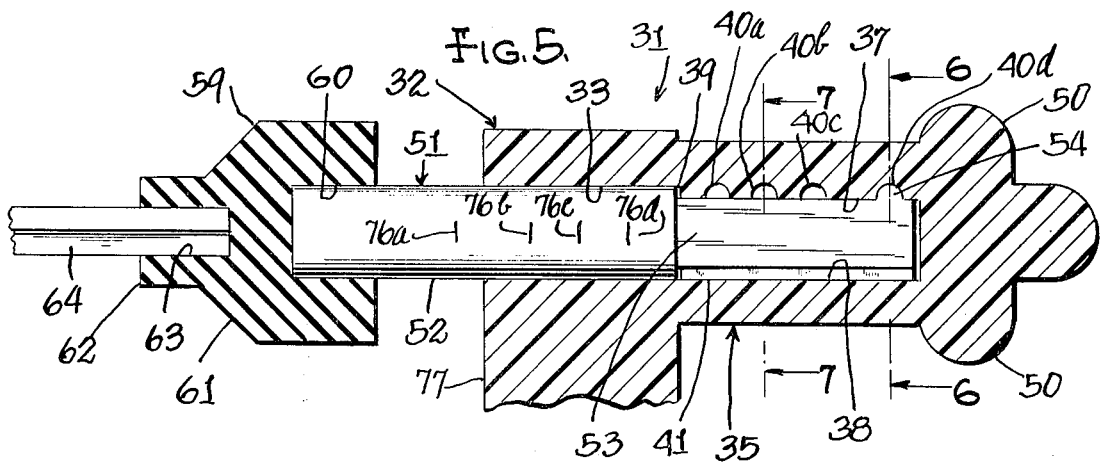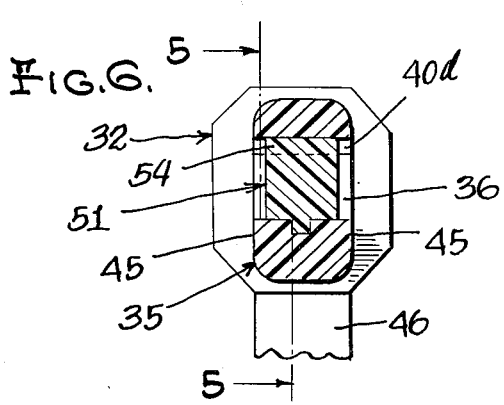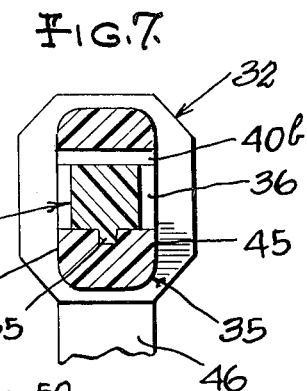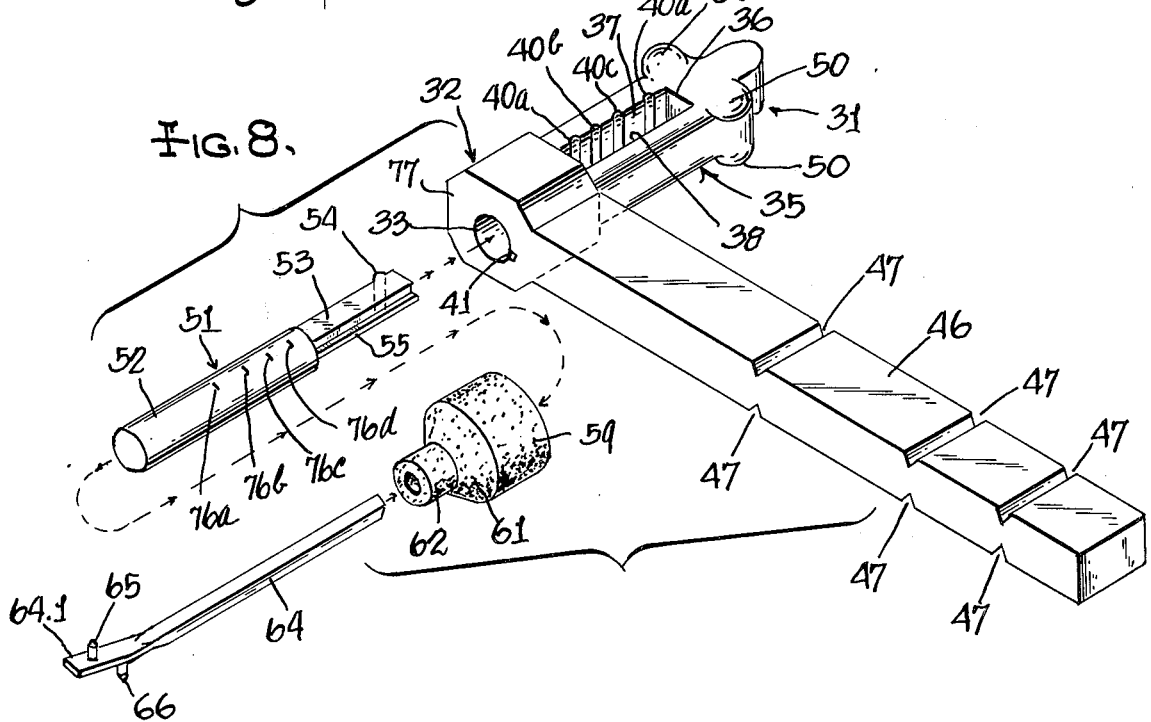

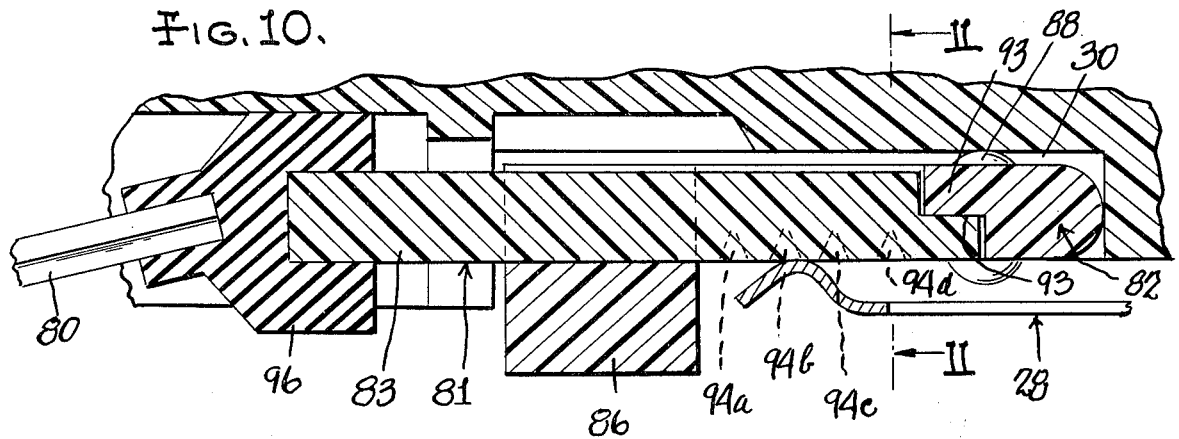
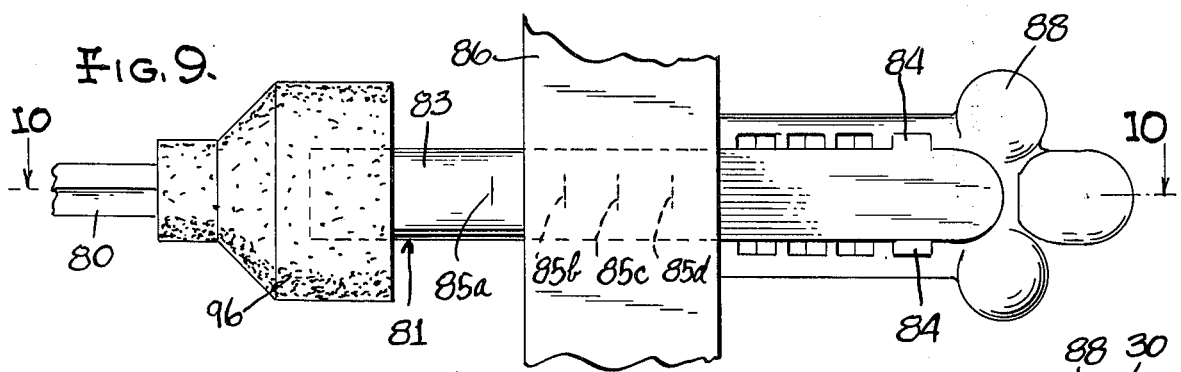
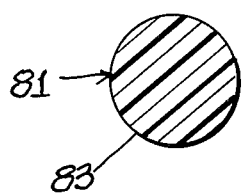
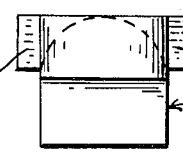
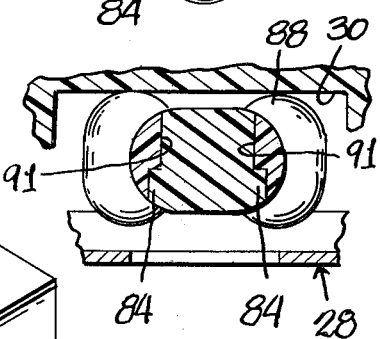
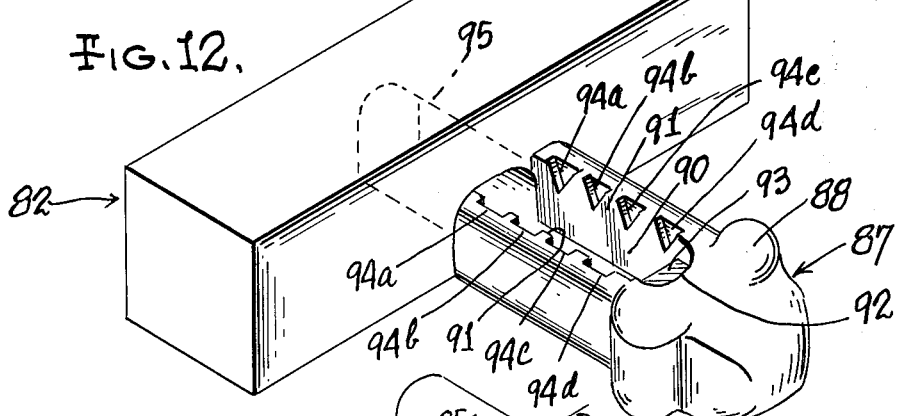
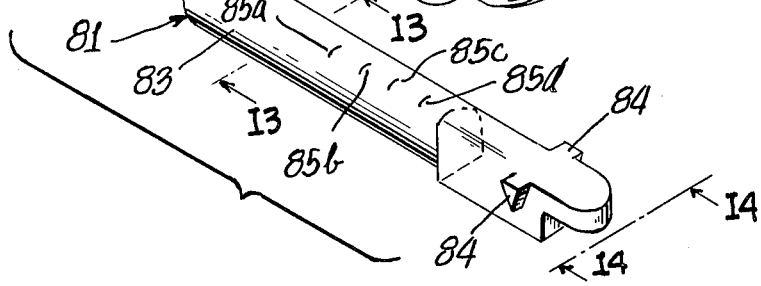

NEEDLE ASSEMBLIES FOR PHONOGRAPH PICKUP CARTRIDGES

BACKGROUND AND SUMMARY

An object of our invention is to provide a needle assembly for a phonograph pickup cartridge which provides for selective adjustment or setting of operative sensitivity and compliance to different selected values, to thereby replace the need for manufacture and stocking of a plurality of cartriges having different sensitivities or compliances to suit a predetermined preference.

We are aware of needle assemblies which are commercially referred to as TETRAD assemblies, wherein needle shanks of different lengths are provided for assembly with the shank holder and cartridge drive member and wherein needle shank length represented a predetermined sensitivity and compliance. Since needles are very small, it is difficult for the ordinary person, without special tools, to properly assemble a needle with its holder. Further, a manufacturer was required to produce, and a dealer was required to stock, needles in a pluraltiy of lengths, and certain lengths may be sold faster then others, thus producing an imbalance in stock which constantly required close attention.

Our invention overcomes the above-noted difficulties in that in our improved assembly only one needle shank length is required. By adjustment of the needle shank relative to the drive member along the longitudinal axis of the cartridge, the needle lever ratio is changed to provide for changes in compliance and sensitivity.

We are also aware of U.S. Pat. No. 3,531,601, issued Sept. 29, 1970, to Richard P, Muttick. In this patent, a two-section or two-part phonograph cartridge is required. One part, designated as the transducer mounting structure, carries the mechanoelectric transducer and associated elements, including the transducer and associated elements, and transducer to stylus coupler. The other cartridge part, designated as the cartridge mounting structure, is attachable to the tone arm. In the Muttick patent, the transducer mounting structure is adapted to be guided by the fixed cartridge mount along a guideway on the latter, to a plurality of longitudinally displaced positions. This required a high degree of accuracy in the guideway, and a movement of masses, not necessary in our improved needle assembly.

Our invention requires movement of only one part of low mass and since such part directly carries the needle shank and tip (or tips), accuracy in the adjustment for compliance and sensitivity is improved.

DESCRIPTION OF THE DRAWINGS

In the drawings accompanying this specification and forming a part of this application, there are shown, for purposes of illustration, embodiments which our invention may assume, and in these drawings:

FIG. 5 is a fragmentary, longitudinal section, drawn to an enlarged scale, showing certain portions of our improved construction and corresponding generally to the line 5—5 of FIG. 6, FIGS. 6 and 7 are transverse sectional views corresponding respectively to the lines 6—6 and 7—7 of FIG. 5, FIG. 8 is a separated, perspective view of components of our invention, FIG. 9 is a fragmentary plan view of another embodiment of our invention, FIG. 10 is a longitudinal sectional view corresponding generally to the line 10—10 of FIG. 9, and fragmentarily showing housing structure of FIG. 1 to disclose disposition of this embodiment of our invention, FIG. 11 is a transverse sectional view corresponding to the line 11—11 of FIG. 10, FIG. 12 is a perspective view of certain components of said other embodiment, the parts being shown in inverted relation to better disclose details, FIGS. 13 and 14 are views corresponding respectively to the line 13—13 and 14—14 of FIG. 12, and FIGS. 15 through 17 are schematic perspective views, showing steps in the assembly of certain components of said other embodiment, the parts again being disclosed in inverted relation.

DESCRIPTION OF THE PREFERRED EMBODIMENT

Figure 1:
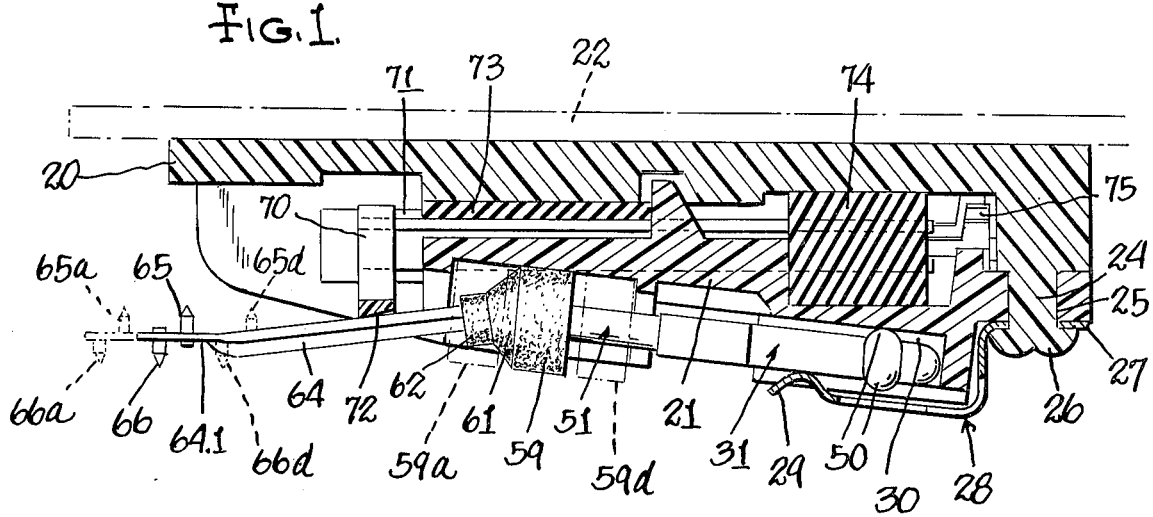
FIG. 1 is a longitudinal sectional view through a phonograph pickup cartridge, showing one embodiment of our invention.

The cartridge casing shown in FIGS. 1 through 4 may be of any suitable construction and that disclosed is illustrative of a presently preferred form. The casing comprises upper and lower housings 20 and 21, respectively, which are formed of any rigid material, such as a suitable plastic, The upper housing 20 is connected to an end of a tone arm 22 (shown in dotted lines in FIG. 1) or to a shroud or the like, carried at the end of a tone arm.

The housing may be held together in any suitable manner, such as a snap connection 23 (see FIG. 3) at the front of the housings, and a rear connection comprising a projection 24 on the upper housing which has a tight fit within an opening 25 in the lower housing. To insure the connection of the housings, the projection 24 is staked, as at 26, over an outer surface of the lower housing. The stake connection also anchors one end 27 of a leaf spring 28, the free end of the spring having an upwardly curled portion 29 for a purpose to appear.

Disposed within a downwardly opening recess 30 in the lower housing 21 is a handle body 31 which is best illustrated in FIGS. 5 through 8. The body is preferably formed of a suitable rigid plastic and has a head portion 32 formed with a circular hole 33 extending longitudinally therethrough. The body also has a tail portion 35 formed with a slot 36 extending transversely therethrough. As seen in FIG. 5, the side walls 37 and 38 of the slot are spaced a slightly less distance than the diameter of hole 33, to form a shoulder 39 therebetween. The slot wall 37 is formed with spaced, vertically extending curved grooves 40a, 40b, 40c and 40d, whereas the slot wall 38 is formed with a longitudinally extending keyway 41 which is continued through the head portion 32.

As best seen in FIGS. 6 and 7, the outer side surfaces of the tail portion are flat, as shown at 45—45. The embodiment disclosed in FIGS. 1 through 8 is adapted for use as turnover needle to cooperate with phonograph records made to rotate at different speeds, such as 78 and 33 rpm. The curled end 29 of the spring 29 is wide enough to span the slot 36 and bear against flat surfaces 45 on either side of the slot, to thereby yieldably hold the handle body 31 in one or the other of its turnover positions.

A handle 46 is preferably formed integral with and projects laterally from the head portion 32 and provides manually engageable means for rotating the handle body between its two positions. As seen in FIG. 8, the handle as manufactured is relatively long and has a series of opposed V-grooves 47 therein to adapt the handle body for replacement use in cartridges of various styles. An end user may conform the handle 46 to a desired length by breaking off the free end of the handle at any one of the opposed grooves 47 which come closest to the length of the handle of the needle being replaced.

It will be noted, especially in FIG. 8, that the tail portion of the handle body has somewhat semi-spherical protuberances 50 extending from its opposite flat sides, and these are adapted to space the handle body from the flat wall of the recess 30 in the lower housing 2, and yet permit easy turning of the handle body against the resilient action of the spring 28.

Slidable within the handle body 31 is a stud 51 which is also preferably formed of a suitable rigid plastic. As best seen in FIG. 8, the stud has a cylindrical front end portion 52 and a rear end portion 53 which is rectangular (preferably square) in cross-section. An integral rib 54 complementary to any one of the grooves 40, extends crosswise of one side face of the portion 53 and an integral key 55 extends longitudinally and outwardly of the opposite side face. The cylindrical portion 52 of the stud is adapted to slidably fit through the opening 33 in the head 32, and the square end portion is adapted to slidably fit within the slot 36 of the handle body 31. Only a limited amount of clearance is provided between the side faces of the stud end portion 53 and the side walls 37 and 38 of the slot 36 so that the rib 54 may be moved to seating relation from one groove 40 to another with a snap action. The cross-section of the rib 54 is substantially equal to the cross-sectional contour of a groove 40 so that, one seated, the rib will prevent relative longitudinal movement between the stud and handle body. The key 54 slidably but closely fits within the keyway 41 to prevent relative axial movement between the stud and handle body.

Figure 2:
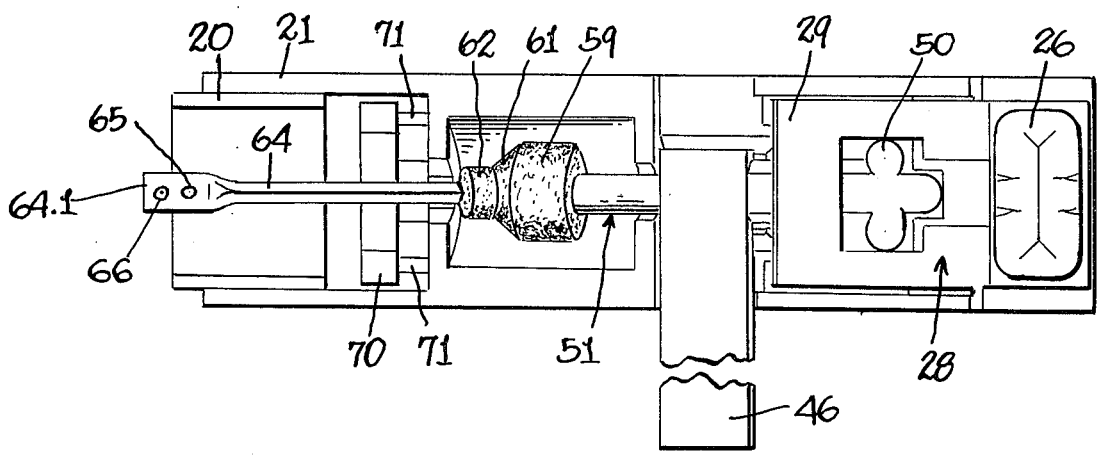
FIG. 2 is a bottom plan view of the cartridge.
Figure 3:
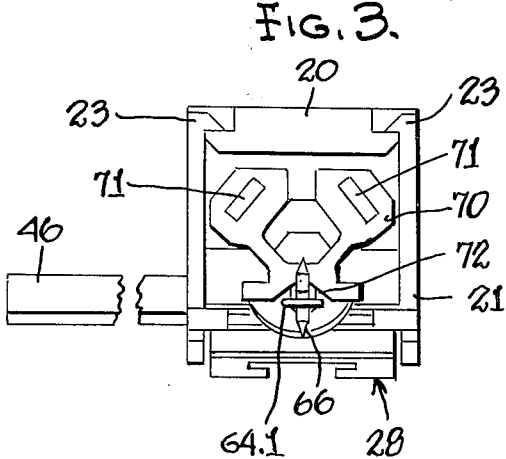
FIGS. 3 and 4 are end views of the cartridge, looking respectively from the left and right hand ends of FIG. 1.
Figure 4:
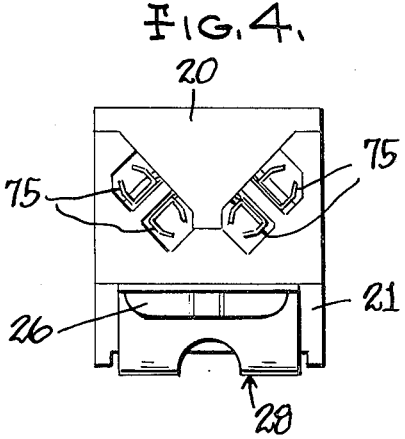

As best seen in FIGS. 1 and 5, a coupler 59 is secured to the free end of the cylindrical portion 52 of the stud 51 and for this purpose the coupler is formed with an axial opening 60 in one end to receive the stud end. It is preferably to cement the stud in the coupler opening to insure close connection of the two. The coupler is formed of a yielding elastomer material so that it may be deformed, as seen in FIGS. 1 and 2, in the final assembly.

The coupler has its opposite end of conical shape, as seen at 61, to enhance distortion thereof, and terminates in a cylindrical stub 62 having an axial opening 63 therein. One end of a stylus rod or shank 64 extends into the opening 63 and is cemented therein. The rod is preferably formed from a thin-wall metal tube that is square in cross-section. The free end of the stylus rod, as seen at 64.1 in FIG. 1. The rod is disposed with opposite side corners vertical, to impart rigidity in the vertical direction and with the flattened free end 64.1 dispose horizontally. Stylus tips 65 and 66 are rigidly secured to the end 64.1 and are displaced a small amount axially of the stylus rod and extend from opposite sides of the end 64.1 for engagement with phonograph records of different speeds. The tips may be formed of diamond or sapphire, as is usual.

As seen in FIGS. 1 through 4, a drive member 70 is secured to the free ends of a pair of beam-type transducer elements 71 in usual manner. The drive member is formed of a relatively rigid plastic and has central groove 72 in its lower surface to straddle the stylus rod 64. The transducer elements may be conventional piezoelectric ceramic beam elements which generate electric signal output when flexed, with the output or sensitivity increasing with their flexure.

A damping pad 73 of a yielding elastomer material is disposed between the upper housing 20 and an intermediate portion of the elements 71—71 and a clamp pad 74 is held between parts of the upper and lower housings to support the inner ends of the elements 71—71. Terminals 75 have electrical connection with the inner ends of the elements, and such terminals are adapted to be electrically connected to a conventional amplifier system.

As best seen in FIGS. 5 and 8, the stud 51 is provided with hashmarks 76a, 76b, 76c, and 76d which are spaced longitudinally thereof in exact correspondence to the spacing between the grooves 40 in the tail portion of the handle body 31. These marks may be in the form of shallow, narrow grooves, which are filled with white paint to contrast with a dark background provided by dark-colored plastic from which the stud and handle body are made. It will be appreciated that the markings may be accompanied by indicia to show the selected sensitivity and compliance, or that other means may be employed to indicate the position of the stud. Preferably, the hash marks are located at various peripheral portions of the stud, so as to be visible from any location.

In the disclosed embodiment, the outer flat face 77 is used as a reference point for the hash marks 76. When only the mark 76a is visible beyond the face 77, the stud 51 is in its innermost position within the handle body 31, with the rib 54 seated in the groove 40d, as seen in FIG. 5. In this position of parts, the coupler 59 is in the position shown by the dot-dash lines 59d in FIG. 1, wherein the stylus rod 64 has been shifted rearwardly of the drive member 70 to position the stylus tips in the dot-dash lines 65d and 66d. Thus, the lever ratio between the stylus tips and the drive member has been reduced to provide a relatively high degree of sensitivity in the ceramic elements 71—71. When the hash mark 76d is visible beyond the face 77, the stud 51 is in its outermost position within the handle body 31, with the rib 54 seated in the groove 40a. In this position of parts, the coupler 59 is in the position shown by the dot-dash lines 59a in FIG. 1, wherein the stylus rod 64 has been shifted forwardly of the drive member 70 to position the stylus tips in the dot-dash lines 65a and 66a. Thus, the lever ratio between the stylus tips and the drive member has been increased to provide a relatively low degree of sensitivity in the ceramic elements 71—71.

Intermediate degrees of sensitivity may be provided by shifting the stud 51 to seat the rib 54 in either the groove 40b or 40c. Shifting of the stud 51 to seat the rib 54 in any one of the grooves 40a through 40d may be accomplished by application of manual force to either the stylus rod 64 or the coupler 59.

DISCLOSURE OF OTHER EMBODIMENT

The embodiment disclosed in FIGS. 9 through 17 is designed for use with non-turnover needle constructions, wherein only one tip is secured to the end of the stylus rod 80. The cartridge construction may be generally similar to that hereinbefore disclosed, with the exception of differences in the stud 81 and the body 82.

In this embodiment, the stud is formed with a cylindrical portion 83 at its forward end which merges with a rear portion having a top surface as a continuation of the round of the cylindrical portion and a rectangular lower part, as seen in FIGS. 12 and 14. A pair of side lugs 84 project from opposite upper sides of the stud 81 at the rear portion thereof and each lug is preferably of V-shape. The cylindrical portion 83 of the stud is provided with hash marks 85a, 85b, 85c, and 85d.

The body 82 is formed with a cross head 86 of substantial size to impart strength, and a tail portion 87 having the usual protuberances 88, only the upper ones of the latter being employed to space the body 82 from a cartridge surface, such as the surface defining the bottom of the recess 30 in the cartridge hereinbefore described. A spring, like previous spring 28, may be used to hold the body in position. The tail portion has a recess 90 extending vertically therethrough, the recess being defined by spaced side walls 91—91, the rear surface of the cross head 86 and a curved rear wall 92. Adjacent to the rear wall, the recess has a step 93 against which the rear end of stud 81 is abutted. Each side wall 91 of the recess is formed with a series of V-shaped grooves 94a, 94b, 94c, and 94d. The grooves in the opposite side walls are transversely aligned to selectively receive the side lugs 84 on the stud 81. As best seen in FIG. 12, the cross head 86 is formed with an opening 95 in its undersurface, the opening having the same cross-sectional outline as the rear of the tail portion 87.

Figure 15:
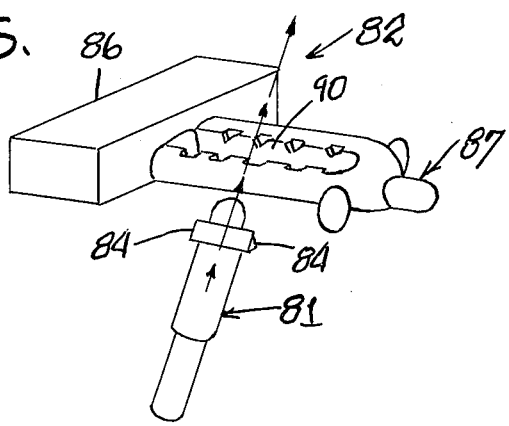
Figure 16:
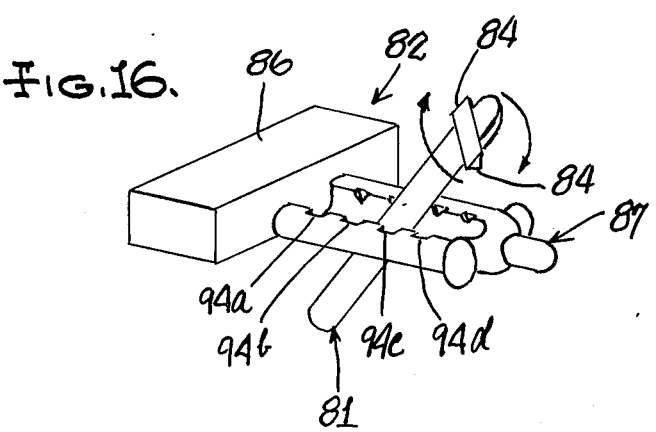
Figure 17:
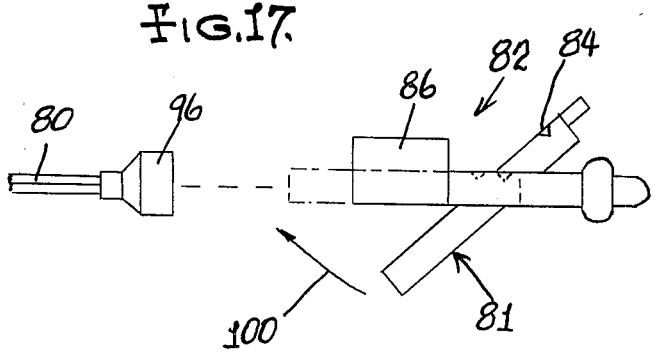

The steps in the assembly of the stud 81 with the body 82 are schematically shown in FIGS. 15 through 17. First, the rear end of the stud 81 is inserted through the recess 90, as seen in FIG. 15 and then the stud is rotated about its axis, as seen in FIG. 16, so that the side lugs 84 are in position to seat within a selected pair of V-shaped grooves. Thereafter, the stud is swung in the direction of the arrow 100 to seating relation within the body 82.

A coupler 96 and stylus rod 80 are connected to the free end of the stud 81 and are disposed in the position shown in FIG. 1. To change the lever arm ratio, for change in sensitivity, the needle assembly, consisting of the stylus rod 80, coupler 96, stud 81 and body 82, is preferably removed from the cartridge housing. The stud 81 is then swung slightly in a direction reverse of that indicated by the arrow 100 to effect disengagement of the side lugs 84 from the V-shaped grooves and the stud is then longitudinally shifted to align the side lugs with a desired pair of V-shaped grooves and the stud then again seated in the body 82.

I claim:

1. In a phonograph cartridge having housing means adapted to be connected to the tone arm of a phonograph, at least one mechanoelectric transducer carried by said housing means and adapted to generate electric signal output when flexed, and a drive member connected to one end of said transducer and extending therefrom, the improvement in a needle assembly for and connectable to said housing means, comprising:
   a body to be held to said housing means,
   an elongated stud slidable within an opening in said body for longitudinal movement relative thereto and having a free end extending from said body,
   a coupler member secured to said stud free end,
   a stylus rod having one end connected to said coupler member and having a stylus point at its free end and adapted to engage in a groove in a rotatably supported phonograph record and thereby cause movement of said stylus rod, said stylus rod being adapted to be engaged by said drive member whereby movement of the former causes flexing of said transducer,
   longitudinal movement of said stud relative to said body causing corresponding longitudinal movement of said stylus rod,
   whereby when said needle assembly is connected to said housing means, said drive member may be engaged with said stylus rod at various positions along the length of the latter,
   said body opening having a series of spaced grooves, and said stud having a detent seatable within a selected groove, whereby to releasably hold said stylus stud in a desired position.

2. The needle assembly according to claim 1, wherein said stud and body have interfitting key and keyway to restrict rotation of said stud within said opening and yet permit longitudinal movement of said stud.

3. The needle assembly according to claim 1, wherein said opening is in part defined by spaced side walls, one wall having said spaced grooves formed therein, and the opposite wall having a keyway formed therein, and said stud having a key fitting within said keyway to restrict rotation of said stud within said opening and yet permit longitudinal movement of said stud.

4. In a phonograph having housing means adapted to be connected to the tone arm of a phonograph, at least one mechanoelectric transducer carried by said housing means and adapted to generate electric signal output when flexed, and a drive member connected to one end of said transducer and extending therefrom, the improvement in a needle assembly for and connectable to said housing means, comprising:
   a body to be held to said housing means,
   an elongated stud slidable within an opening in said body for longitudinal movement relative thereto and having a free end extending from said body,
   a coupler member secured to said stud free end,
   a stylus rod having one end connected to said coupler member and having a stylus point at its free end and adapted to engage in a groove in a rotatably supported phonograph record and thereby cause movement of said stylus rod, said stylus rod being adapted to be engaged by said drive member whereby movement of the former causes flexing of said transducer,
   longitudinal movement of said stud relative to said body causing corresponding longitudinal movement of said stylus rod,
   whereby when said needle assembly is connected to said housing means, said drive member may be engaged with said stylus rod at various positions along the length of the latter,
   said body opening in part being defined by spaced side walls and each side wall having a series of spaced V-shaped grooves formed therein, and which are in paired relation, said stud having a pair of transversely spaced V-shaped detents which are seatable within selected pairs of grooves in said side walls, whereby to releasably hold said stylus rod in a desired position.

5. A phonograph cartridge, comprising:
   housing means adapted to be connected to the tone arm of phonograph, a body of rigid material held within a cavity of said housing means, an elongated stud of rigid material carried by said body for longitudinal movement relative thereto and having a free end extending from said body, a stylus rod of rigid material having a stylus point at a free end thereof which is adapted to engage in a groove in a rotatably supported phonogragh record to move said free end in accordance with undulations in said record groove, a coupler member of elastomer material having one end connected to said stud and the other end connected to an end of said stylus rod which is opposite said free end, the elasticity of said coupler member permitting movement of said stylus rod free end and the point carried thereby so that the latter may track within said record groove, an elongated mechanoelectric transducer having one end carried by said housing means and adapted to generate electrical signal output when flexed, a drive member connected to the opposite end of said transducer and extending therefrom to engagement with said stylus rod intermediate the ends thereof, said drive member transmitting movement of said stylus rod to said transducer to flex the latter, said coupler member and said stylus rod being movable longitudinally in unison with said stud, to provide for engagement of said drive member at various positions along the length of said stylus rod for adjustment of the lever ratio between the stylus tip and drive member, said housing means having an additional cavity which is elongated in the direction of movement of said coupler member, said stylus rod and said stud, said additional cavity having a defining wall which is slidably engaged by said coupler member for guiding the latter in its movement.

6. A phonograph cartridge, comprising:

housing means adapted to be connected to the tone arm of a phonograph, a body of rigid material held within a cavity of said housing means, said body having a longitudinal opening therein and said opening being non-circular, as elongated stud of rigid material having a portion of a cross-section complementary to said non-circular opening and fitting within the latter for support and for longitudinal movement relative to said body, said stud having a free end extending from said body, said stud portion and said body opening having interengageable detent members on facing wall surfaces for releasably holding said stud in a selected position, a stylus rod of rigid material having a stylus point at a free end thereof which is adapted to engage in a groove in a rotatably supported phonograph record to move said free end in accordance with undulations in said record groove, a coupler member of elastomer material having one end connected to said stud and the other end connected to an end of said stylus rod which is opposite said free end, the elasticity of said coupler member permitting movement of said stylus rod free end and the point carried thereby so that the latter may track within said record groove, an elongated mechonoelectric transducer having one end carried by said housing means and adapted to generate electrical signal output when flexed, a drive member connected to the opposite end of said transducer and extending therefrom to engagement with said stylus rod intermediate the ends thereof, said drive member transmitting movement of said stylus rod to said transducer to flex the latter, said coupler member and said stylus rod being movable lontitudinally in unison with said stud to provide for engagement of said drive member at various positions along the length of said stylus rod for adjustment of the lever ratio between the stylus tip and drive member.

* * * * *

UNITED STATES PATENT OFFICE
CERTIFICATE OF CORRECTION

PATENT NO. : 4 065 134
DATED : December 27, 1977
INVENTOR(S) : Henry J. Cvetko and John L. Kuykendall It is certified that error appears in the above-identified patent and that said Letters Patent are hereby corrected as shown below:

Column 2, line 64, spring "29" should be- - - 28- - - -.

Column 3, line 18, "2" should be - - - - -21 - - - - .

Column 3, line 39, "one" should be - - - - once - - - .

Column 3, line 48, "preferably" should be- - -preferable- -.

Column 3, line 59, after "The free end of the stylus rod," the following is omitted - - - is flattened and bent at a slight angle to the axis of the rod,- - - - .

Column 3, line 62, "dispose" should be - - - - disposed- - -.

UNITED STATES PATENT OFFICE
CERTIFICATE OF CORRECTION

Patent No. 4,065,134　　　　　　　　Dated December 27, 1977

Inventor(s)　　Henry J. Cvetko et al.

It is certified that error appears in the above-identified patent and that said Letters Patent are hereby corrected as shown below:

Claim 4, first line after "phonograph" insert -- cartridge- --.

*Signed and Sealed this*

*Fourth* Day of *April 1978*

[SEAL]

Attest:

RUTH C. MASON  
*Attesting Officer*

LUTRELLE F. PARKER  
*Acting Commissioner of Patents and Trademarks*